United States Patent

[11] 3,631,657

[72] Inventor Joseph G. Wilson
New York, N.Y.
[21] Appl. No. 14,848
[22] Filed Feb. 16, 1970
[45] Patented Jan. 4, 1972
[73] Assignee Shell Oil Company
New York, N.Y.
Original application Jan. 19, 1968, Ser. No. 721,902, now Patent No. 3,541,766, dated Nov. 24, 1970. Divided and this application Feb. 16, 1970, Ser. No. 14,848

[54] CENTRIFUGAL SEPARATOR VESSEL
4 Claims, 3 Drawing Figs.
[52] U.S. Cl. .................................................. 55/348,
55/358, 55/423, 55/431, 55/449, 55/457, 55/466
[51] Int. Cl. .................................................. B01d 45/12
[50] Field of Search ................................... 55/423, 449

[56] References Cited
UNITED STATES PATENTS

| | | | |
|---|---|---|---|
| 1,311,573 | 7/1919 | Newburgh | 55/423 |
| 1,353,431 | 9/1920 | Sims | 55/431 |
| 2,235,892 | 3/1944 | Kuhner | 55/423 X |
| 2,352,038 | 6/1944 | Tolke | 285/229 |
| 2,462,193 | 2/1949 | Hulsberg | 23/288 |
| 2,490,798 | 12/1949 | Gohr et al. | 208/161 X |
| 2,506,293 | 5/1950 | Copeland | 285/299 X |
| 2,553,175 | 5/1951 | Davenport et al. | 55/343 |
| 2,688,588 | 9/1954 | Beam | 23/288.3 S X |
| 2,900,324 | 8/1959 | Patton et al. | 208/164 X |
| 2,901,332 | 8/1959 | Randall | 23/288 |
| 2,941,621 | 6/1960 | Dygert et al. | 55/348 X |
| 2,986,278 | 5/1961 | Bjorklund | 209/144 |
| 3,083,082 | 3/1963 | Kleiber | 208/161 X |
| 3,254,476 | 6/1966 | Kuset et al. | 55/345 X |

FOREIGN PATENTS

| | | | |
|---|---|---|---|
| 641,422 | 5/1962 | Canada | 55/346 |
| 218,811 | 7/1924 | Great Britain | 55/342 |

Primary Examiner—Dennis E. Talbert, Jr.
Attorneys—Oswald H. Milmore and J. H. McCarthy ABSTRACT: Apparatus for cleaning gas comprising a hollow outer vessel having an inner wall and a clean gas outlet communicating through the wall of the outer vessel with the interior of the outer vessel. An inner casing is attached to, supported by and within the outer vessel and has its vertical axis coincident with the vertical axis of the outer vessel. The inner casing is spaced from the inner wall of the outer vessel so as to form an annular space therebetween. Partition means is disposed within the inner casing sealingly dividing the inner casing into at least a pair of chambers. The first of these chambers has an opening therein communicating with the clean gas outlet of the outer vessel and a gas inlet operatively engages the second of these chambers for introducing gas burdened with particles into the second of these chambers. A plurality of centrifugal separators cooperates with the second of these chambers, each of these separators having an outer first tube with its upper end communicating with the interior of the second of these chambers. Particle and blowdown gas collecting means is located within the vessel and communicates with openings in the lower ends of the outer tubes of the separators. Each of the separators further includes a second tube mounted within each of the outer tubes having its upper end communicating with the interior of the second of the chambers. Swirl-producing means is located between the first and second tubes for producing a swirling motion to gas introduced within the first tubes and expandable structural means operatively engages the inner casing and is adapted to allow the inner casing to substantially expand and contract under apparatus operating conditions without damaging the structure of the outer vessel. A particle and blowdown gas outlet operatively engages the outer vessel and communicates with the particle and blowdown gas collection means for removing particles and blowdown gas from the apparatus.

PATENTED JAN 4 1972 3,631,657

INVENTOR:
JOSEPH G. WILSON
BY:
Glen R. Grunewald
HIS ATTORNEY

INVENTOR:
JOSEPH G. WILSON
BY: Jean R. Grunewald
HIS ATTORNEY

CENTRIFUGAL SEPARATOR VESSEL

This application is a division of Ser. No. 721,902, filed Jan. 19, 1968, now U.S. Pat. No. 3,541,766, issued Nov. 24, 1970.

It is known to mount a number of small-diameter tubular separators within a casing having an inlet chamber from which the particle-ladened gas is supplied to the several separators and a clean gas outlet chamber into which the separators discharge, the separators having outlets through which the separated particles are discharged together with a minor fraction, e.g., 1–10 percent, of the gas, herein called blowdown gas. Usually, with this type of arrangement, a single casing is used to enclose these various chambers and the supporting mechanism for the plurality of individual tubular separators employed. Such an arrangement is shown in U.S. Pat. Nos. 2,941,621 and 2,986,278. It is found that on occasion this single casing of existing designs fails structurally because of the metallurgical problems associated with operating in a high-temperature and high-pressure gaseous environment and changes in temperature and/or pressure. These failures are attributable to the expansion and contraction of the internal metal work which comes into direct contact with the high-temperature and high-pressure gases. This expansion and contraction of the internal metal work along with its weight stresses the connecting joints where the internal metal work is joined to the single enclosing casing to such a degree that the joints become distorted or cracked, breaking the pressure seals and ruining the casing for future operations. It is the purpose of this invention to overcome the drawbacks associated with such single casing arrangements.

The instant apparatus for cleaning gases includes an outer pressure-retaining vessel completely enclosing an inner casing internally suspended within the outer vessel. The inner casing performs substantially the same function as the single casing of the prior art arrangements, being divided into operational chambers, e.g., a gas inlet chamber and a clean gas outlet chamber, and supporting a plurality of individual centrifugal separators. This inner casing is arranged within the outer vessel in such a way that an annular space exists therebetween. Forming a portion of the connecting means between the casing and outer vessel is an expansion joint which, in conjunction with the annular space between the casing and vessel, permits expansion and contraction of the inner casing both vertically and horizontally during high-temperature and high-pressure operation without damaging the outer pressure retaining vessel.

The invention will be further described with reference to the drawings wherein.

Figure 1:
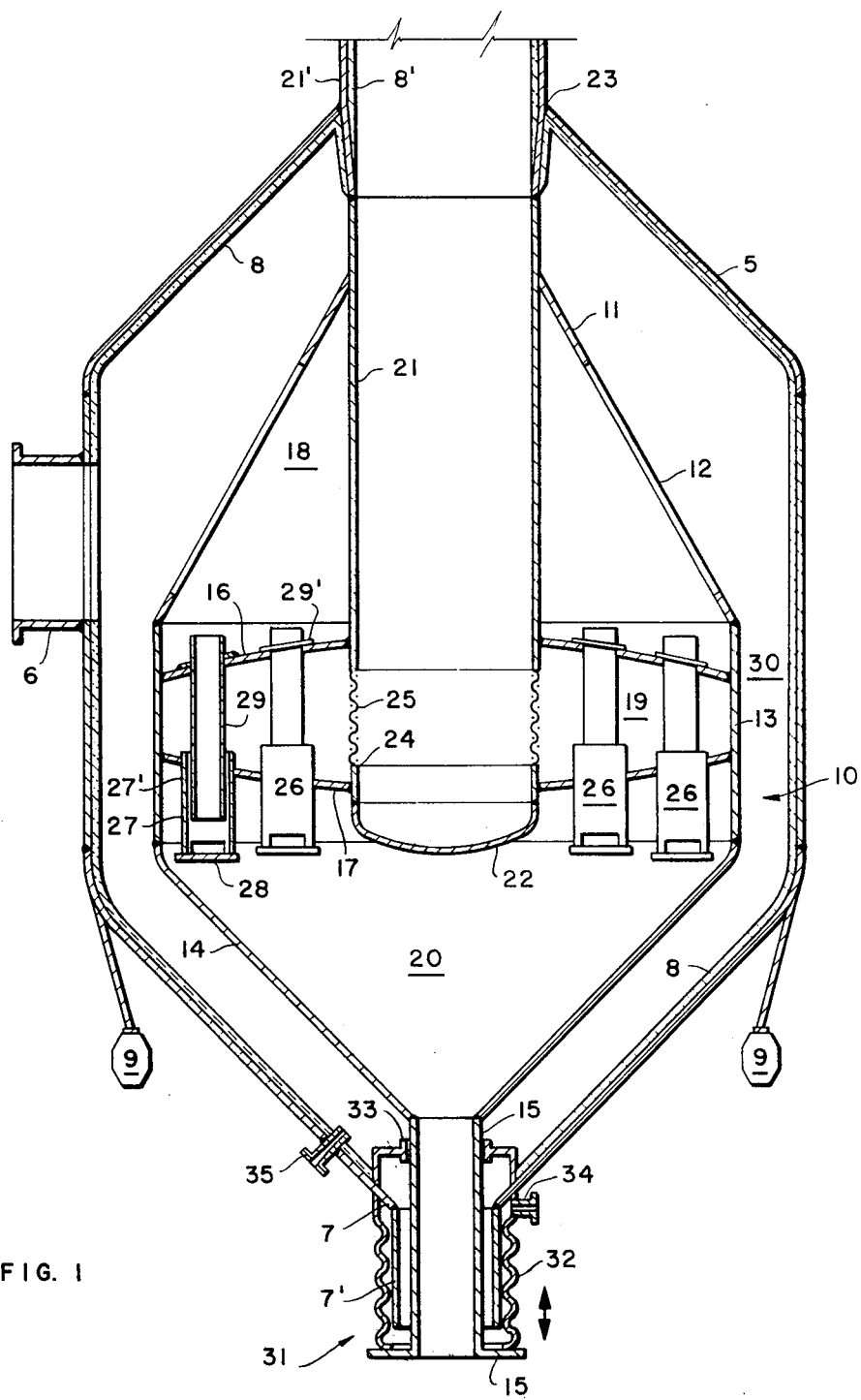
FIG. 1 is a vertical sectional view through the complete apparatus of one embodiment of the invention.

Referring to the drawings in detail, FIG. 1 shows an outer pressure-retaining vessel, or housing 5 having a clean gas outlet nozzle 6 and a bottom outlet opening 7 therein, the bottom outlet opening being in communication with a duct 7' which extends downwardly therefrom. Around the inside of vessel 5 there may be a layer of insulating material 8. The outer vessel 5 is externally supported at point 9 (actual supporting apparatus not shown). Internally suspended within vessel 5 is an inner vessel, or casing 10 having an upper frustoconical support section 11 with openings 12 therethrough, a cylindrical section 13 and a frustoconical bottom section 14, to which is connected a discharge duct 15 which extends downwardly from an opening in the section 14 through the bottom outlet opening 7 and duct 7' of the outer vessel 5 and is connected to the outer vessel 5 by an expansion joint 31 and flange 15'. As shown in FIG. 1, the casing 10 is symmetrically suspended within housing 5, that is, the longitudinal axis of casing 10 is coincident with the longitudinal axis of housing 5. The casing 10 contains upper and lower transverse partitions 16 and 17 within the cylindrical section 13 which divide the casing into a first upper clean gas outlet chamber 18, a second intermediate inlet chamber 19 and a third lower collection chamber 20 forming a particle and blowdown gas collecting means. The partitions 16 and 17 are preferably dished for structural reasons. An inlet duct 21 extends downwardly through the top of the outer vessel 5, the top of the casing 10 and through the upper partition 16 at the central axis and is provided at the bottom with a bottom closure 22 which forms a sump below the bottom of the inlet chamber 19. The operating load and weight of the casing 10 is transferred to the outer vessel at the welded junction 23 through the inlet duct 21 from which the casing is supported. Insulation material 8' may be provided in the upper part 21' of the inlet duct, which preferably is of increased diameter.

The duct 21 has side openings 24, preferably covered by screens 25, for the passage of inlet gas, burdened with solids, from the duct into the inlet chamber 19. Coarse particles are prevented by these screens from entering the inlet chamber and fall into the sump.

A plurality of tubular centrifugal separators 26 are mounted with their axes vertical in closely adjacent relation around the inlet duct 21, only two of which are shown to each side of duct 21 in FIG. 1. The design of the individual centrifugal separators does not form a part of this invention and such separators can be of any suitable design, e.g., like the centrifugal separators disclosed in U.S. application Ser. No. 358,742 filed Apr. 10, 1964; U.S. Pat. to Dygert et al., No. 2,941,621; or U.S. Pat. to Bjorklund, No. 2,986,278. As shown schematically in section in FIG. 1, each separator includes an outer tube 27 which extends downwardly in sealed relation through a hole in the lower partition 17 to which it is fixed, e.g., by welding, and has the lower end thereof covered by a discharge cap 28 which traps the solid particles and blowdown gas descending the tube and discharges them into the collection chamber 20 through openings in the cap. Each separator further includes an inner tube 29 of lesser diameter than and concentrically within the outer tube and extending upwardly through a hole in the partition 16, and swirl-producing means 27', e.g., vanes, fixed to the inner tube and situated in the annular space between the inner and outer tubes, which impart a swirling motion to gas which flows downwards within the outer tube toward the discharge cap 28. Each inner tube 29 has an annular support plate 29' welded thereto and resting on partition 16, the swirl-producing means being slidable within the outer tube.

In operation, the feed gas, containing suspended particles, is admitted through the inlet duct 21 from a feed gas source, e.g., a regenerator, and flows radially out through the holes 24 covered by screens 25 into the inlet chamber 19, together with particles small enough to pass the screen. The gas then enters the several tubes 27 spaced about the inlet duct, assuming a swirling motion upon passing the swirl-producing means 27' whereby the particles are hurled by centrifugal force against the walls of the outer tubes. The central cores of clean gas ascend through the inner tubes 29 into the outlet chamber 18, from which the gas is discharged through openings 12 in the casing to the clean gas outlet nozzle 6 of the outer vessel which leads to an expander (not shown). The separated particles descend to the bottoms of the outer tubes and are discharged together with blowdown gas through the discharge caps 28 into the collection chamber 20.

During high-temperature and high-pressure operations, the inner casing will be subject to thermal stresses causing expansion of the inner casing with reference to the outer vessel. To prevent the damage caused by such stresses in the single casing arrangements, the inner casing of the instant device is free to expand both vertically and horizontally within the outer vessel. An annular space 30 between the casing 10 and the outer vessel 5 accommodates this movement in conjunction with an expansion joint 31. Expansion joint 31 includes an expandable section 32, e.g., formed of a corrugated tube, which is rigidly fixed at the bottom thereof to flange 15' of the lower end of discharge duct 15 and at the top to the wall of the outer vessel 5 so that the expandable section 32 is outside of and surrounding duct 15. In sliding contact with discharge duct 15 within the annular space 30 is a guide element such as the hub of a spider 33 which is fixed to the inside of the outer vessel adjacent the bottom outlet opening 7. A steam purge nozzle 34 for the expansion joint is provided along with a critical flow exhaust nozzle 35, which is used to continually or intermittently purge the annular space 30 by exhausting therethrough a small amount of gas from the clean gas outflow. Thus, by this arrangement, the thermal stresses on the outer vessel are reduced by providing a steam-purged expansion joint and an annular clearance which accommodate unconstrained vertical and horizontal thermal expansion of the inner casing with reference to the outer vessel.

Referring to the embodiment shown in FIG. 2, the arrangement and operation are basically the same as that shown in FIG. 1 but certain structural differences exist which will now be described. The outer pressure-retaining vessel 36 has a clean gas outlet nozzle 37 and a bottom outlet nozzle 38 therein. The inside of vessel 36 is preferably covered with a layer of insulating material 39. The external support for vessel 36 is centered at points 40 (actual supporting apparatus not shown). Internally and symmetrically suspended within the outer vessel is an inner casing 41 containing a plurality of tubular separators 42. These tubular separators are of the same type utilized in the first embodiment, each separator including an outer tube, an inner tube, swirl-producing means therebetween and a discharge cap at the bottom of the outer tube. They are carried within the casing by upper and lower transverse partitions 43 and 44 which form a first upper clean gas outlet chamber 48 and a second intermediate inlet chamber 45. The operating load and weight of the inner casing are transferred by a circumferentially continuous skirt support 46 to the outer vessel at an annular insulating junction 47. The space enclosed by skirt support 46 above partition 43, together with upper partition 43, form the clean gas outlet chamber 48 which opens into outlet nozzle 37. Between the continuous casing-skirt support surface and the wall of outer vessel 36, below insulating junction 47, is an annular space 49. Below the inner casing 41 and continuous with the annular space 49 around the casing is third collection chamber 50 formed by the lower portion of vessel 36 which opens into bottom outlet nozzle 38.

An inlet duct 51 extends downwardly through the top of the outer vessel 36 and through the upper partition 43 at the central axis and is provided with a bottom closure 52 which forms a sump below the bottom of the inlet chamber 45. Duct 51 has side openings 53, preferably covered by screens 54, for the passage of inlet gas, burdened with solids from the duct into the inlet chamber 45, as described with reference to FIG. 1. Forming a section of the duct 51 between the top of the outer vessel and partition 43 is an expansion joint, e.g., a circumferential rugation 55. This expansion joint performs the same function as expansion joint 31 in the first embodiment.

Figure 2:
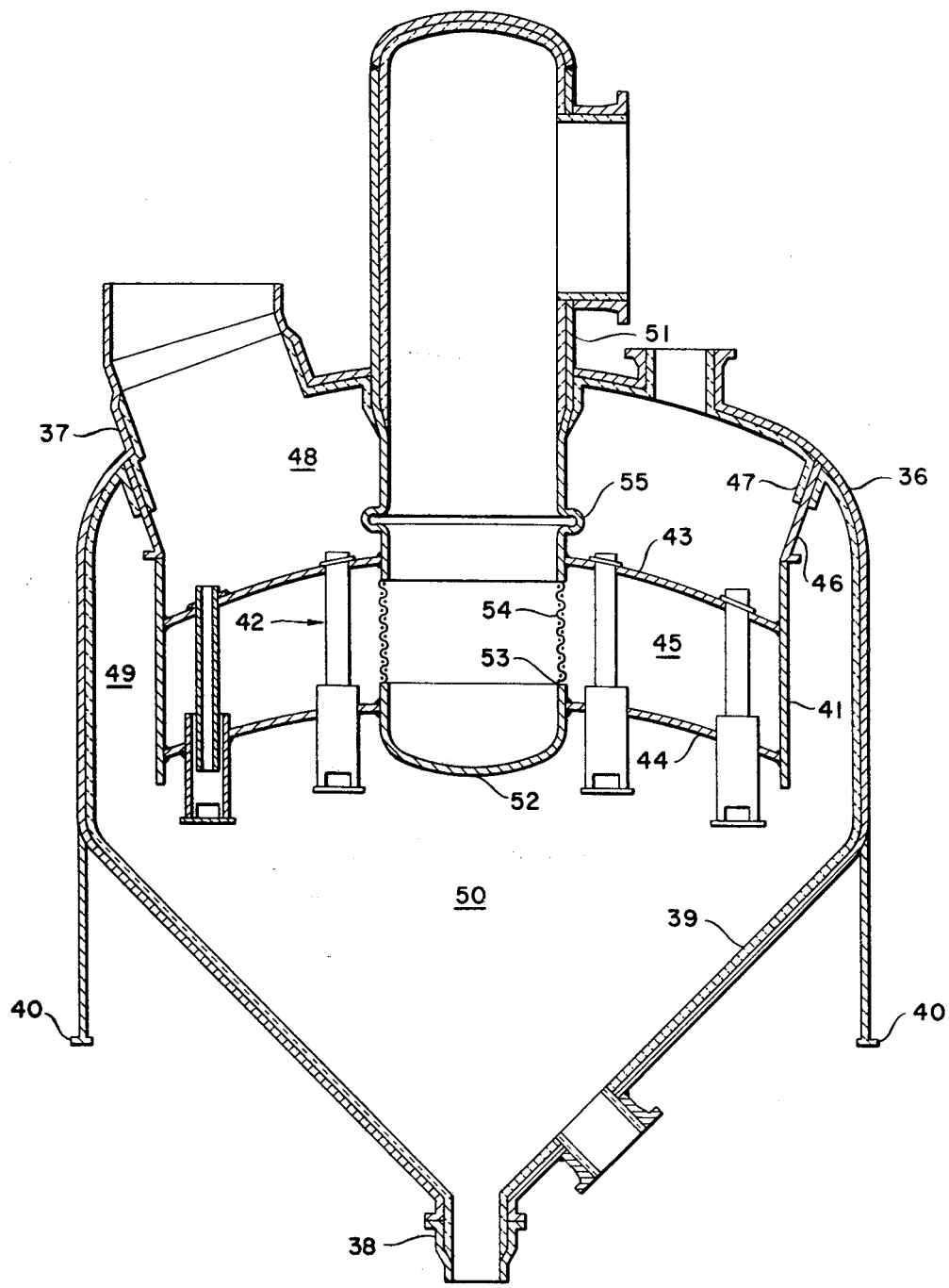
FIG. 2 is a vertical sectional view of another embodiment of the invention.

The operation of the embodiment shown in FIG. 2 is the same as that described with reference to FIG. 1. Feed gas burdened with particles enters the inlet duct from a source, such as a regenerator, and passes into the inlet chamber 45 through openings 53 in the duct. The gas then enters the outer tubes of separators 42 and passes through swirl-producing means therein. Clean gas ascends through the inner tubes into the outlet chamber 48 and through nozzle 37 to an expander (not shown) while the particles and blowdown gas are discharged into collecting chamber 50 through discharge caps in the bottoms of the outer tubes.

The high-temperature and high-pressure gaseous environment created during operation will cause casing 41 to expand. The annular space 49 around the casing and expansion joint 55 will accommodate unconstrained vertical and horizontal expansion of the casing with reference to the outer vessel.

Figure 3:
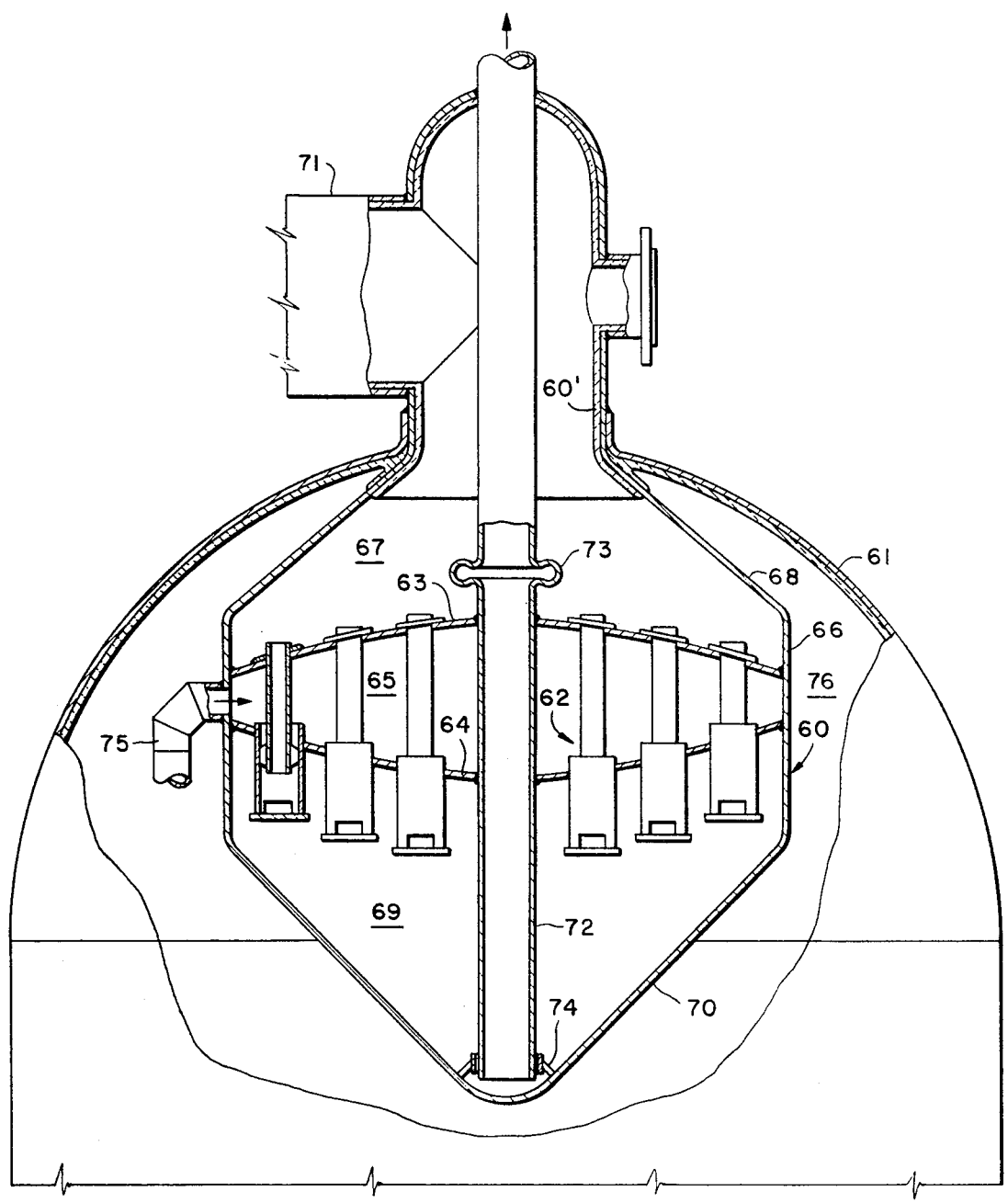
FIG. 3 is a vertical sectional view of still another embodiment of the invention.

The embodiment shown in FIG. 3 is similar in arrangement and function to those shown in FIGS. 1 and 2, but is structurally designed to be placed inside the insulated upper portion of a main vessel generating catalyst containing gases, thereby eliminating the need for an additional separator vessel. FIG. 3 shows a catalyst separator casing 60 symmetrically suspended within a catalyst regenerator vessel 61. As described with reference to FIGS. 1 and 2, a plurality of tubular separators 62 are carried within casing 60 by upper and lower partitions 63 and 64 which form an intermediate inlet chamber 65. The operating load and weight of the inner casing are transferred to the outer vessel at the welded junction 60' which is similar to welded junction 23 in FIG. 1. However, it is not necessary that the inner casing be supported in this way, for any suitable support means would be acceptable, e.g., the weight can be transferred to the outer vessel by a circumferentially continuous skirt support as shown in FIG. 2.

Whichever form of internal support is adopted, the arrangement of operating sections would remain the same. Partitions 63 and 64 which support the individual separators 62 divide the casing into a first clean gas outlet chamber 67 formed by the upper supporting section 68 of the casing, a second intermediate inlet chamber 65 enclosed by a portion of the central cylindrical section 66 of the casing and a third collection chamber 69 formed by the lower enclosing section 70 of the casing which serves as a particle and blowdown gas collecting means. Clean gas outlet chamber 67 connects with outlet nozzle 71 for exhausting clean gas from the system. Extending from a position within the collecting chamber 69 through the intermediate inlet chamber 65 and clean gas outlet chamber 67 and out the top of the separator device is an exhaust pipe 72. Forming a section of pipe 72 within chamber 67 is an expansion joint, e.g., a circumferential rugation 73. In sliding contact with exhaust pipe 72 within chamber 69 is a guide element such as the hub of a spider 74 which is fixed to the inside of section 70 of the casing near the bottom thereof.

In operation, since the separator device of FIG. 3 is located within the main vessel containing the catalyst-laden gases, the gas containing catalyst fines enters the device from below through a number of inlet pipes 75, only one of which is shown. The catalyst-laden gas flows into the intermediate inlet chamber 65 and into the tubular separators 62. The catalyst-free gas flows upward through the inner tubes into clean gas outlet chamber 67 and out nozzle 71 as previously described. The gas containing the catalyst fines flows from the bottom of the tubular separators into collection chamber 69, and upwards through exhaust pipe 72. Excessive thermal stresses are prevented from being transmitted to the outer vessel by means of the expansion joint 73 in the exhaust pipe acting in cooperation with the annular space 76 surrounding the inner casing 60 to accommodate unconstrained vertical and horizontal thermal expansion of the inner casing with reference to the outer vessel.

What has been shown and described is a novel structure for a centrifugal separator wherein a casing supporting a plurality of tubular separators and associated apparatus is internally suspended within an outer pressure retaining vessel leaving an annular space therebetween which cooperates with an expansion joint interconnected between the casing and outer vessel to accommodate unconstrained vertical and horizontal expansion of the casing within the outer vessel to reduce thermal stress upon the latter. The disclosed structures and any obvious deviations therefrom are intended to be covered by the following claims.

I claim:
1. Apparatus for cleaning gas comprising:
  a hollow outer vessel having an inner wall and a clean gas outlet communicating through the wall of the outer vessel with the interior of said outer vessel;
  an inner casing attached to and supported by and within said outer vessel and having its vertical axis coincident with the vertical axis of said outer vessel;
  said inner casing being spaced from the inner wall of said outer vessel so as to form an annular space therebetween;
  partition means disposed within said inner casing sealingly dividing said inner casing into at least a pair of chambers;
  the first of said chambers having an opening therein communicating with the clean gas outlet of the outer vessel;

a gas inlet operatively engaging the second of said chambers for introducing gas burdened with particles into said second of said chambers;

a plurality of centrifugal separators cooperating with the second of said chambers;

each of said separators having an outer first tube with its upper end communicating with the interior of the second of said chambers;

particle and blowdown gas collecting means located within said vessel and communicating with openings in the lower ends of the outer tubes of said separators said particle and blowdown gas collecting means comprising a third lower chamber within said inner casing;

each of said separators further including a second tube mounted within each of said outer tubes and having its upper end communicating with the interior of the second of said chambers and its lower end communicating with the interior of said first tube;

swirl-producing means located between said first and second tubes for producing a swirling motion to gas introduced within said first tubes;

expandable structural means operatively engaging said inner casing particle and blowdown gas outlet operatively engaging said outer vessel and communicating with said particle and blowdown gas collection means for removing particles and blown gas from said apparatus, said particle and blowdown gas outlet comprising an exhaust duct operatively engaging said outer vessel and extending upwardly within said inner casing from a point adjacent to and in communication with said third lower chamber, through the first and second of said chambers and out through the top of the apparatus for exhausting particles and blown-down gas therefrom; and expandable structural means operatively engaging said inner casing and adapted to allow the inner casing to substantially expand and contract under apparatus operating conditions without damaging the structure of the outer vessel, said expandable structural means comprising an expansion joint formed in said exhaust duct and extending circumferentially of said exhaust duct at a point adjacent to the first of said chambers whereby said inner casing is free to expand and contract substantially without damaging said outer vessel.

2. The apparatus of claim 1 wherein said inner casing is attached to and supported by and within said outer vessel by a circumferentially continuous skirt support.

3. The apparatus of claim 1 wherein there is provided within said third lower chamber within said inner casing a guide element means disposed in sliding relationship with said exhaust duct for guiding said exhaust duct during movement of said exhaust duct resulting from movement of said expandable structural means.

4. The apparatus of claim 3 wherein said guide element means includes a spider having a hub surrounding said exhaust duct, said spider being fixed to the inside of said third lower chamber within said inner casing, said exhaust duct being disposed for sliding movement with respect to said hub and said hub guiding said exhaust during movement of said exhaust duct.

\* \* \* \* \*